Nov. 6, 1928. 1,690,772

T. G. DELBRIDGE ET AL

TREATMENT OF MINERAL OILS

Filed May 21, 1925  2 Sheets-Sheet 1

INVENTORS:
Thomas G. Delbridge
and Henry H. Dure
BY Cornelius D. Ehret
their ATTORNEY.

Nov. 6, 1928.  1,690,772
T. G. DELBRIDGE ET AL
TREATMENT OF MINERAL OILS
Filed May 21, 1925
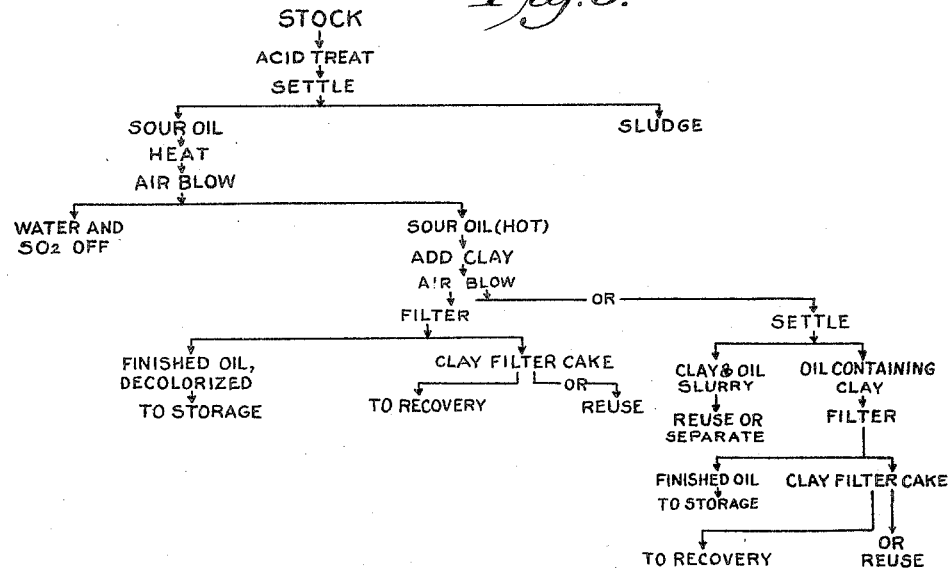
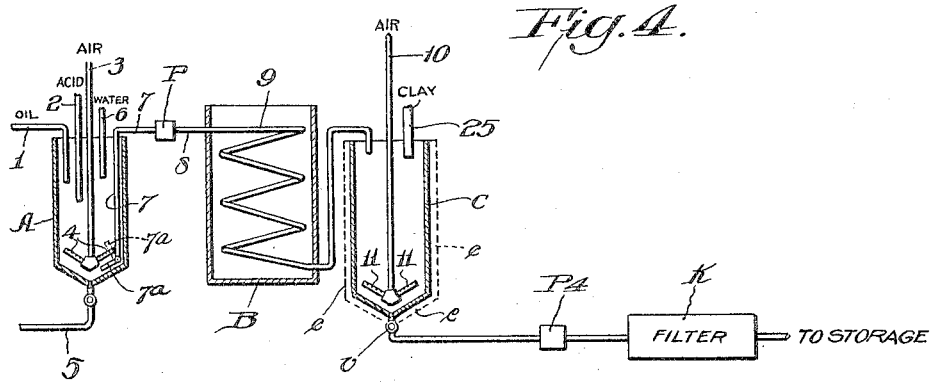

Patented Nov. 6, 1928.

1,690,772

UNITED STATES PATENT OFFICE.

THOMAS G. DELBRIDGE AND HENRY F. DURE, OF PHILADELPHIA, PENNSYLVANIA, ASSIGNORS TO THE ATLANTIC REFINING COMPANY, OF PHILADELPHIA, PENNSYLVANIA, A CORPORATION OF PENNSYLVANIA.

TREATMENT OF MINERAL OILS.

Application filed May 21, 1925. Serial No. 31,744.

Our invention relates to the purification and decolorization of mineral oils, and particularly crude petroleum, its distillates and residues, by contact with finely divided decolorizing or absorbing materials, such as fuller's earth, acid-treated California clay, carbonaceous materials, and equivalents.

In accordance with our invention, mineral oils of the character above referred to, and especially lubricating stocks or oils destined for lubricating purposes, previously acid-treated or not, and while at temperature suitable to reduce their viscosities if necessary, are blown or agitated by air or equivalent, either before, during or after addition of finely divided clay or equivalent decolorizing or absorbing material.

Further in acordance with our invention, if the oil or stock has been acid-treated, the resultant sour oil is blown or agitated with air or equivalent while at suitably elevated temperature, to remove moisture and compounds such as sulphur dioxide, or the like, in solution or entrained in the oil, and thereafter the dry sour oil, while at elevated temperature, is blown or agitated with air or equivalent in the presence of the finely divided clay or equivalent material.

Further in accordance with our invention, the finely divided clay may be added in the form of a slurry of oil and clay; and more particularly, the clay first added to the oil to be treated may be in the form of a slurry of oil and clay, which latter has been one or more times used in a process of the general character above referred to.

Further in accordance with our invention, particularly in a continuous process, involving the addition of clay and blowing with air or equivalent in successive stages, fresh and/or revivified clay is brought into mixture with the oil and blown with air or equivalent in a later stage of the process, and in an earlier stage the clay after use in the aforesaid later stage is added in any suitable form, as for example a slurry of oil and clay.

It is a characteristic of our invention that the oil during treatment if maintained at elevated temperature is not or need not be rapidly or artificially cooled; that the temperature is not such that the oil will be to a material degree affected as to color; that the color is not materially affected by the air or other oxygen-bearing gas utilized in blowing the oil; that the temperature is or need be only such as to effect suitably low viscosity for convenient manipulation; and that the color of the finished oil is stable or does not darken upon standing.

Our invention resides in the method of the character hereinafter described and claimed.

For an understanding of our method, reference is to be had to the accompanying drawings, in which:

Fig. 3 is a chart or flow sheet illustrating one of various batch processes comprehended in our invention.

Fig. 4 is an illustration of one of various systems or forms of apparatus utilizable in carrying out a method of the character indicated in Fig. 3.

The oil purified and decolorized may be of any character capable of improvement in substantial degree by our process. There may be treated those oils which are normally acid-treated and thereafter neutralized by alkali; there may also be treated those oils which, in ordinary refinery practice, are not acid-treated, but merely percolated through fuller's earth or equivalent, generally in granular state. In accordance with our process, the last mentioned type of oils may or may not be given a preliminary acid treatment depending upon conditions. Thus, for example, in the case of those oils which would require relatively large quantities of clay or equivalent for decolorizing them, we may first effect acid treatment materially to reduce the amount of clay required. In any event, with any character of oil aforesaid, it is characteristic of our process that at some stage the mixture of oil with clay or equivalent is blown or agitated with air or equivalent, or agitated by any means while in contact with air.

Figure 1:
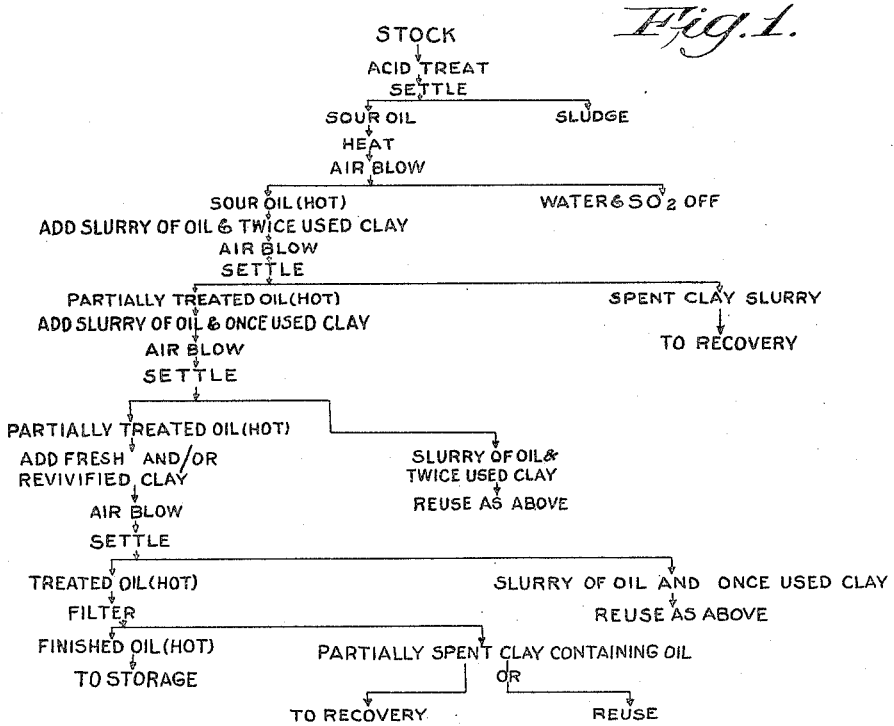
Figure 1 is a chart or flow sheet illustrating one of various continuous multi-stage processes comprehended in our invention.
Figure 2:
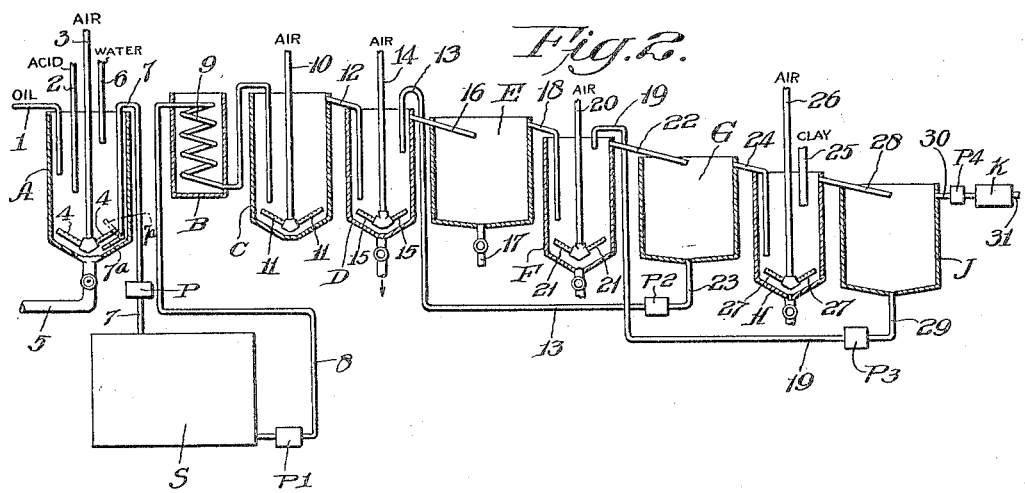
Fig. 2 is an illustration of one of the systems or forms of apparatus which may be utilized for carrying out a method of the character indicated in Fig. 1.

Referring to Figs. 1 and 2, an oil, such for example as may be benefited by or require acid treatment, is delivered through the pipe 1 into the agitator tank or chamber A, and sulphuric acid, of any suitable strength, preferably 66° Bé. or stronger, and of the order of 40% of that usually required for acid-alkali treatment of the same oil, is introduced through the pipe 2, and the mixture agitated by air or equivalent introduced under pressure through the supply pipe 3 and thence through the perforated distributor pipes 4 into the mixture, which is so agitated, for a suitable period, for example, about 45 minutes, until the reaction is complete, whereupon the agitation is discontinued and the resultant sludge is permitted to settle, is drawn off through the valve-controlled pipe 5 and pumped to the acid recovery plant. To ensure simultaneous settlement from the oil while in the chamber A of the finely divided particles of sludge or "pepper" which would otherwise remain in suspension in the oil, a small quantity of water, as of the order of 0.3% to 0.5% of the oil, is added near the end of the aforesaid agitation, as through the water supply pipe 6. It will be understood, however, that any other suitable or equivalent method may be utilized for settling or removing the fine particles of sludge, which is desirable for economy in clay and air blowing subsequently used.

The sour oil is then drawn off through the pipe 7 terminating adjacent the bottom of the chamber A in the pivoted or swinging pipe 7ª. The removal of the sour oil upwardly in the manner indicated, as distinguished from drawing it off through the pipe 5, ensures that a minimum of the aforesaid finely divided sludge or "pepper" will be carried off with the sour oil. This is of advantage, for the presence of the sludge particles in the sour oil causes darkening when the oil is heated, and increases the quantity of clay required for treatment. The sour oil so drawn off is delivered by pump P to suitable storage tank S of sufficiently great capacity to hold successive batches of sour oil delivered thereto, and so always to have on hand a sufficient supply of sour oil to practice our purifying and decolorizing process continuously.

The oil after acid treatment and removal of sludge, including the finely divided sludge or "pepper," is a substantially completely de-sludged acid-treated or sour oil.

By pump P¹ the sour oil is preferably continuously delivered through the pipe 8 through the coil 9 of the heater B, of any suitable type, such, for example, in which the heat is derived from steam. In the heater B the oil is raised to a temperature of the order of 150° F. to 210° F., depending upon the viscosity of the oil, which is so heated principally to effect sufficiently low viscosity for convenient and sufficiently rapid manipulation. It is desirable further that the temperature should not exceed those of the order indicated, for with these low temperatures the oil is much less susceptible to discoloration.

The hot sour oil passes from the heater B into the chamber or dehydrator C, where the oil is blown by air or equivalent delivered under pressure through the supply pipe 10 and through the perforated distributor pipes 11 into the oil. The air blowing, continued for a period of the order of one-half hour, removes water and other compounds, such, for example, as sulphur dioxide, the removal of which and of moisture at this stage, prior to contact of the oil with the clay or equivalent, is of advantage in materially decreasing the quantity of clay required for decolorization and purification. This increase in efficiency of the clay effected by this step may be due to several causes. First, the removal of the sulphur dioxide dissolved or entrained in the oil eliminates the necessity for neutralizing it with the clay, and thereby decreases the amount of clay otherwise necessary. Second, the removal of moisture from the oil is much more complete than in the usual process, and, since excess moisture materially decreases the decolorizing power of the clay, the efficiency of the clay is in effect enhanced. Third, this preliminary air blowing effects polymerization of or other change in the color-imparting bodies in the oil to render them more readily removable by the clay. In any event, the fact is that the efficiency of the clay is materially increased or enhanced by this preliminary air blowing in the chamber C, and it shall be understood that the foregoing explanation of its cause shall not be limitive of our invention.

The blowing with air or equivalent has the further advantage in that relatively low temperatures of the order aforesaid may be utilized and yet effect sufficiently high degree of dehydration.

In lieu of air for the preliminary treatment of the oil in advance of its contact with clay or equivalent, there may be utilized any equivalent gas, whether or not containing oxygen, through an aeriferous or oxygen-containing gas is preferred; and in the appended claims there is utilized for brevity the term "air" to include air and its equivalents.

The hot, dry, sour oil, substantially free of sulphur dioxide and the like, overflows through the pipe 12 into the agitator tank or chamber D, into which is introduced also through the pipe or line 13, from a later stage of the process, a slurry of oil and clay. the latter previously used twice in later stages of the process, but still retaining substantial purifying and decolorizing power. The mixture of oil and clay is agitated or blown with air or equivalent introduced under pressure through the supply pipe 14 and through the perforated distributor pipes 15 into the mixture. The partially spent clay more or less neutralizes the sour oil and reacts therewith partially to purify the oil, and the clay itself becomes substantially inactive or exhausted. The mixture of spent clay and partially decolorized oil overflows through the pipe 16 into the settling tank E, where nearly all the clay settles to the bottom and is conducted through pipe 17 for treatment to separate therefrom the associated oil by any suitable process.

The partially decolorized and purified oil, substantially free of clay, overflows through the pipe 18 into the agitator chamber or tank F, into which is introduced also through the pipe or line 19 a slurry of oil and once-used clay. The oil and clay mixture is agitated or blown in the chamber F by air or equivalent introduced under pressure through the supply line 20, and through the perforated distributors 21. The decolorizing power of the once-used clay is further reduced, but the clay is not rendered entirely inactive; and the partially decolorized and purified oil is further purified, as by further partial decolorization and neutralization. The oil and clay mixture overflows through the pipe 22 into the settling tank G, to the bottom of which nearly all the clay settles, and a slurry of oil and clay is removed through the pipe 23 and forced by the pump $P^2$ through the pipe 13, as aforesaid, into the agitator tank D, where the oil first comes into contact with clay.

The oil containing a slight amount of clay overflows from the settling tank G through the pipe 24 into the agitator tank or chamber H, where fresh and/or revivified finely divided clay is introduced, as through a chute 25. The oil and clay mixture is agitated or blown by air or equivalent introduced under pressure through the supply pipe 26, and the perforated distributor pipes 27. The fresh and/or revivified clay at this stage completes the purification, decolorization and neutralization of the oil, and is itself reduced somewhat in activity, as, for example, to an efficiency of about one-third, more or less, of fresh clay. The mixture of oil and clay overflows through the pipe 28 into the settling tank J, where nearly all of the clay settles to the bottom and is removed in a slurry of oil and clay through the pipe 29 and forced by the pump $P^3$ through the aforesaid pipe 19 into the agitator tank F, where the second stage of clay treatment is effected, as above described. The purified oil from which the major portion of the clay has settled overflows through the pipe 30 and is forced by pump $P^4$ through the filter K, of any type suitable for removal of the small quantity of clay suspended in the oil. The purified or finished oil passes from the filter K through the line 31 to storage, it being understood, however, that the filtering operation may be omitted. If a filter, such as K, be used, the filter cake separated thereby may be re-used in any of the stages of the process, or may be subjected to a recovery process.

In the continuous process of the character above described, it is preferred that the clay or equivalent shall be passed through the system countercurrent to the flow of the oil, so that untreated oil is acted upon first by partially spent clay, while partially treated oil is treated by fresh and/or revivified clay. It will be understood, however, that our invention is not limited in this respect, for the contact of oil with clay may be effected in a single stage, or when effected in several stages the clay may be passed concurrent with the oil, or the clay utilized in any stage may be there employed until exhausted, and not passed to any other stage.

Throughout the treatment above described, the oil is maintained at elevated temperature, due either to the heating solely at the heater B or by application of additional heat in or adjacent any one or more of the subsequent agitating chambers or settling tanks. Furthermore, the temperature may be maintained by suitably heat-insulating or jacketing any one or more of the agitating chambers and settling tanks.

Referring to Figs. 3 and 4, illustrative of a batch process in accordance with our invention, the oil treated may be of any of the characters hereinbefore referred to. In the example illustrated it may be delivered through the pipe 1 into the agitator or acid-treating chamber A, into which acid is delivered through the pipe 2 and air for agitation is delivered through the pipe 3, as hereinbefore described in connection with the continuous process. The sludge is drawn off through pipe 5. In this case, the sour oil is pumped directly through the pipe 7 by the pump P and pipe 8 to the coil 9 of the heater B, where the oil is raised to a temperature of the order hereinbefore stated. The hot sour oil then passes into the blowing or agitator tank or chamber C, which preferably is provided on its exterior with suitable lagging or heat insulation $c$. Air or equivalent is introduced under pressure through the supply pipe 10 and through the perforated distributors 11, with consequent removal of moisture, sulphur dioxide, etc. Clay, as fresh dry clay, finely divided as aforesaid, is introduced, as through a chute 25, and the mixture agitated and blown by the air. The blowing is continued for a suitable length of time to effect the desired purification of the oil, comprising decolorization and neutralization. After suitable period of time, the agitation is discontinued, whereupon the valve $v$ is opened and the mixture of oil and clay is forced by the pump $P^4$ to a filter, as K, from which the finished oil, still hot, is delivered to storage or any other desired destination. The filter cake of clay and contained oil may be treated for recovery and separation by any suitable method.

The use of a slurry of oil and partially spent clay is applicable also to a batch process of the character described, in certain cases. For example, the slurry of oil and clay from the treatment of a light colored oil may be used for the treatment of a darker oil, if the difference between the physical properties of the two materials is not sufficiently marked as to cause the darker product to be materially affected by the addition of the oil in the slurry. Furthermore, the slurry from the batch treatment of certain stocks may, with the addition of a small quantity of fresh and/or revivified clay, be used for treating another batch of the same stock.

In the process herein described, the clay, as fuller's earth, acid-treated California clay, or the like, is in a state of fine subdivision, as, for example, such that about 40% will pass through a 200 mesh sieve. The amount of clay used may be from about 1% to about 50% by weight of the oil treated. The amount of clay required depends upon the type of oil and its previous history or treatment. For such oils as are normally acid-treated and thereafter neutralized by alkali, clay in the amount of about 3% to about 5% by weight of the oil is ordinarily used, whereas for oils which are not acid treated clay to the amount of about 40% to about 50% by weight may be used. Under some circumstances, as above described, clay to the extent of as low as 1% by weight of the oil may be sufficient.

While air is preferred for agitating and blowing the oil in the presence of clay, it will be understood that any other suitable gas containing oxygen, may be used. Air, aeriferous or oxygen-containing gas, such as gaseous products of combustion, flue gas and the like, may be utilized, since in accordance with our process, particularly at the low temperatures employed, substantial oxidation of the oil or oxidation thereof to an extent to affect color, does not occur. In any event, it is characteristic of our process that oxygen or air need not be excluded from contact with the oil in any stage, particularly during contact with clay or equivalent, and mechanical agitating mechanism may be dispensed with, though it will be understood the oil and clay mixture may be agitated by suitable mechanism while in contact with air. In the appended claims to this subject-matter the term "air" includes air and equivalent aeriferous and oxygen-containing gases.

The temperatures utilized in our process are lower than those ordinarily used in processes of this general character, in which it has been common to use temperatures of the order of 300° F. In accordance with our invention, such high temperatures are not necessary, and we find it desirable to hold the oil at a temperature below the boiling point of water to prevent foaming of the oil due to the moisture remaining in the oil after water settling. It is, however, not our purpose to limit our invention to any specified temperature or range of temperatures.

Furthermore, the blowing after acid treatment removes moisture, effecting a clear, bright oil as the final product. This action is of especial importance in view of the fact that air-dried fresh or raw clay as used contains absorbed moisture of the order of 8%, which in accordance with our process may be removed by the air blowing, whereas in processes not utilizing air blowing the water liberated from the clay is present in the resulting oil and causes cloudiness upon cooling, unless the moisture be removed by prolonged heating at relatively high temperature.

Oils treated in accordance with our invention are not subject to appreciable discoloration or darkening in contact with air or oxygen containing gases at the temperatures utilized. Notwithstanding the fact that the oil during treatment may be exposed to air or oxygen for long periods at the aforesaid temperatures, appreciable darkening of the oil does not occur; on the contrary the air blowing serves to stabilize the the color resulting from the acid and clay treatment. For this reason the usual precautions to avoid oxidation or contact of air with the oil may be dispensed with, and especially the need for speed in practicing the process is eliminated. The fact that the time required for the oil to be treated in accordance with our process need not be limited or shortened without detrimental effect on the oil, makes possible a continuous process, as above described, as distinguished from a batch process.

Once the oil has been heated as hereinbefore described, it remains at elevated temperature throughout the process, and at the end of the treatment is still at elevated temperature, and while still hot may be passed to storage, where cooling occurs at natural rate. In accordance with our invention, therefore, it is not a characteristic of our process that the hot oil is at any stage rapidly or artifically cooled.

In the case of treatment of sour oils as herein described, the use of clay or the like effects neutralization of the oil in addition to its decolorization. Nevertheless, in accordance with our invention, other decolorizing materials, such as finely divided bone black or equivalent carbonaceous materials, may be utilized, particularly upon those oils which do not require neutralization. Or upon oils requiring neutralizations there may be utilized a mixture of clay and carbonaceous materials.

For the sake of brevity in the appended claims, however, the term "clay" is utilized in a generic sense to include fuller's earth and clays proper, and, in addition, equivalent decolorizing materials of any of the characters herein referred to, or a mixture of them.

Herein the term "sour oil" is employed as defining an acid-treated oil which has not been neutralized.

As appearing in the appended claims the term "unrefined" defines a hydrocarbon oil or a fraction thereof which has not been subjected to chemical treatment for refining or decolorizing it.

What we claim is:

1. The method of decolorizing unrefined hydrocarbon oil, which comprises acid treating the oil, separating from the oil substantially all of the sludge formed, passing air into the acid-treated unneutralized oil while at elevated temperature, to condition the oil for subsequent lay treatment, thereafter adding finely divided clay to the unneutralized oil, and intimately commingling air with the mixture of oil and clay while at substantially elevated temperature below 212° F.

2. The method of decolorizing unrefined hydrocarbon oil, which comprises acid treating the oil, separating from the oil substantially all of the sludge formed, passing air through the acid-treated unneutralized oil while at elevated temperature to condition the oil for subsequent clay treatment, thereafter continuously flowing the unneutralized oil through successive stages, continuously passing clay in succession through later and earlier of said stages, intimately commingling air with the oil and clay mixture in at least one of said stages, and maintaining the oil and clay mixture in each of said stages at elevated temperature.

3. The method of decolorizing unrefined hydrocarbon oil, which comprises acid-treating the oil, separating from the oil substantially all of the sludge formed, passing air through the acid-treated unneutralized oil while at an elevated temperature to condition the oil for subsequent treatment, thereafter adding finely divided clay to the unneutralized oil, and intimately commingling air with the mixture while at a temperature within the range from about 150 to 210 degrees F.

4. The method of decolorizing unrefined hydrocarbon oil, which comprises adding acid to the oil, blowing the oil and acid mixture with air, adding water to settle the sludge formed from the oil, separating the oil from the sludge, heating the oil, passing air into the acid-treated unneutralized oil while at elevated temperature to condition the oil for subsequent clay treatment, thereafter adding finely divided clay to the unneutralized oil, and intimately commingling air with the mixture of oil and clay while at substantially elevated temperature.

THOMAS G. DELBRIDGE.
HENRY F. DURE.